Aug. 25, 1925.

J. N. PARKER

TRACTOR MOWER

Filed July 26, 1920

WITNESS

INVENTOR
Joseph N. Parker.
BY
ATTORNEYS

Aug. 25, 1925.
J. N. PARKER
1,550,839
TRACTOR MOWER
Filed July 26, 1920   2 Sheets-Sheet 2
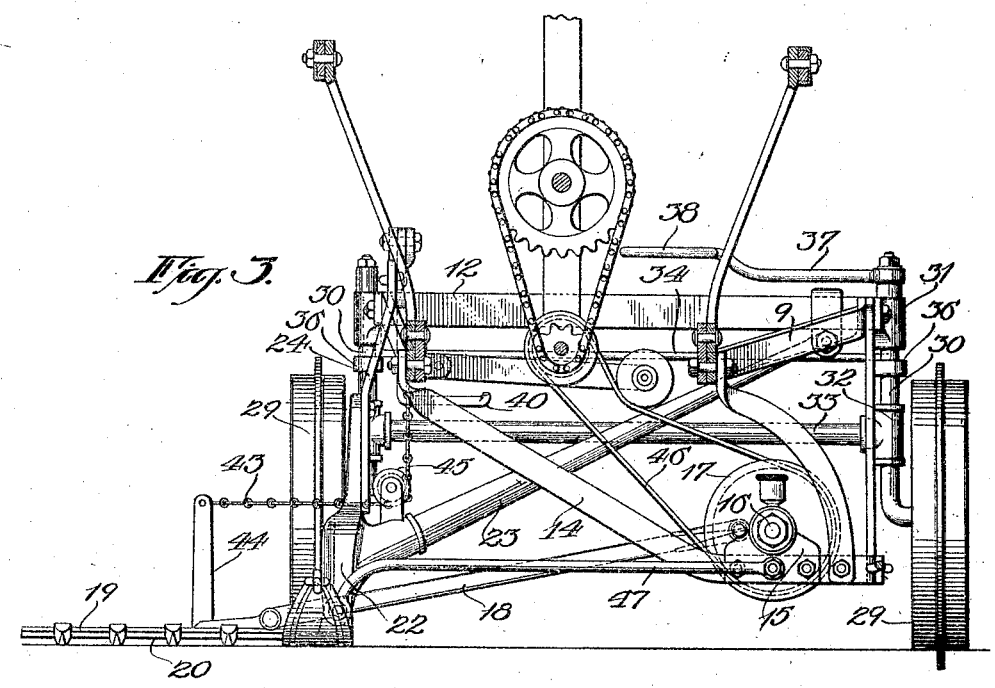
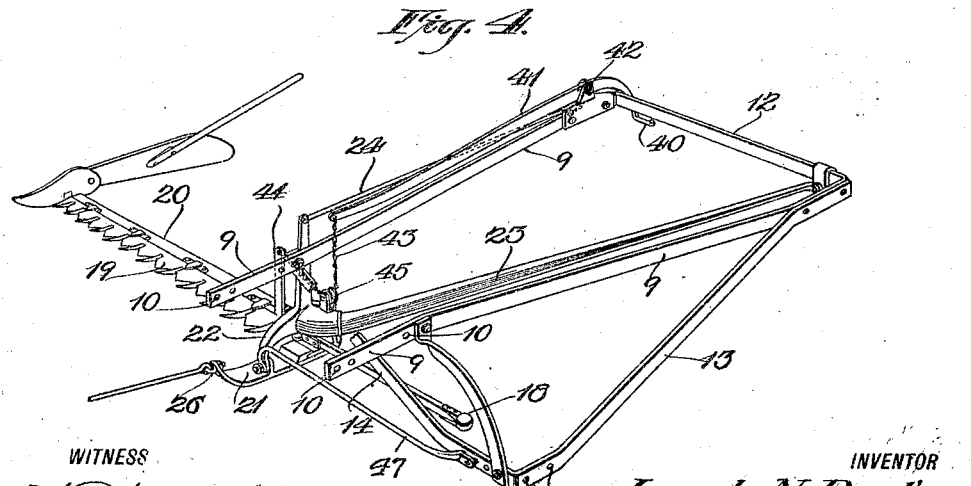

Patented Aug. 25, 1925.

1,550,839

UNITED STATES PATENT OFFICE.

JOSEPH N. PARKER, OF BEDFORD CITY, VIRGINIA.

TRACTOR MOWER.

Application filed July 26, 1920. Serial No. 398,873.

*To all whom it may concern:*

Be it known that I, JOSEPH N. PARKER, a citizen of the United States, and a resident of Bedford City, county of Bedford, and State of Virginia, have invented certain new and useful Improvements in Tractor Mowers, of which the following is a full, clear, and exact description.

Among the principal objects which the present invention has in view are: To provide a mover which may be operatively connected for traction and operating purposes with a tractor and the engine thereof; to provide a mower of the character mentioned with means for steering the same to form a rectangular corner; to provide a steering mechanism for the mower independent of the tractor to which it is attached, to enable an operator to independently and simultaneously control the steering mechanism of the tractor and the steering mechanism of the mower, to the end that the mower may be disposed for operation in paths substantially perpendicular each to the other, and that the two mechanisms may be co-ordinated; and to provide a simple and effective mechanism for elevating the outer end of the cutter bar.

Drawings:

Figure 3 is a vertical section, on enlarged scale, the section being taken as on the line 3—3 in Figure 2;

Figure 4 is a detail view in perspective, showing a portion of the mower frame and means for attaching the same to the tractor.

Figure 1:
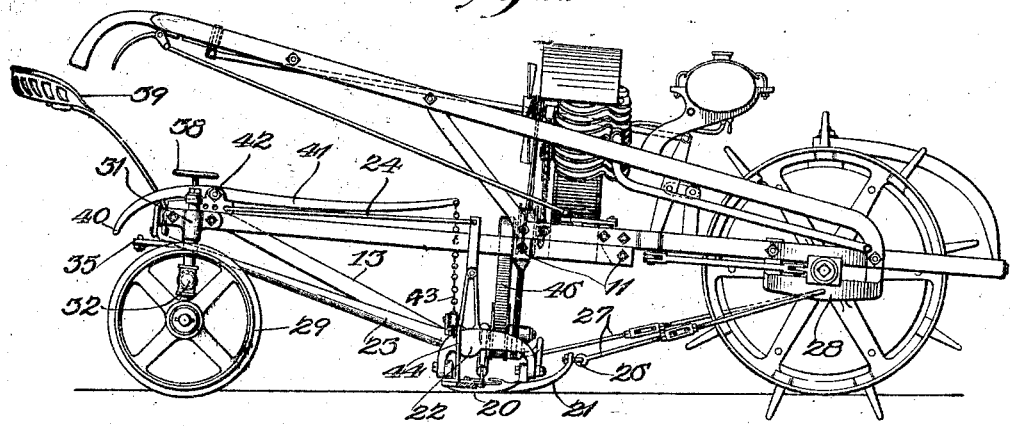
Figure 1 is a side elevation of a mower and tractor therefor operatively connected.

The tractor shown in the accompanying drawings is the same construction, and operates in the same manner, as set forth in the application for Letters Patent filed by me the 3rd day of May, 1920, and having the Serial Number 378,563, to which application cross reference is here made.

The mower is attached to the said tractor by means of the side bars 9, with which the frame of said mower is provided. The side bars have perforations 10, through which bolts 11 are driven, which bolts extend also through a drop plate in the side bars of the tractor frame. The mower frame is provided at the rear end with the cross bar 12, and is furnished with a reach bar 13. The reach bar 13 and brace 14 support the bracket 15 wherein is mounted the bearings 16 of the crank wheel 17. The crank wheel 17 is pivotally connected with the pitman 18 for reciprocating the blade 19 of the finger bar 20.

The finger bar 20 is fastened to a shoe 21, which is pivoted to the yoke 22, which is braced on the mower frame by the coupling bar 23, and the tie rod 24. The lower extremity of the reach bar 13 has bolt holes 25, and the shoe 21 is provided with an eyelet 26, both holes and eyelet being to accommodate the turn buckle rods 27, the forward ends of which are attached to the drop frame 28 of the tractor body.

By means of this draft attachment an even strain is exerted upon the mower frame. As seen best in Figure 3 of the drawings, the carrying wheels 29 are mounted in journals provided on vertically disposed pivoted shafts 30, the upper ends whereof swivel in bearings formed in the brackets 31, and in brackets 32 at the end of the drop frame 33, which serves to steady the shafts 30. The two shafts 30 are operatively united by a cross bar 34.

Figure 2:
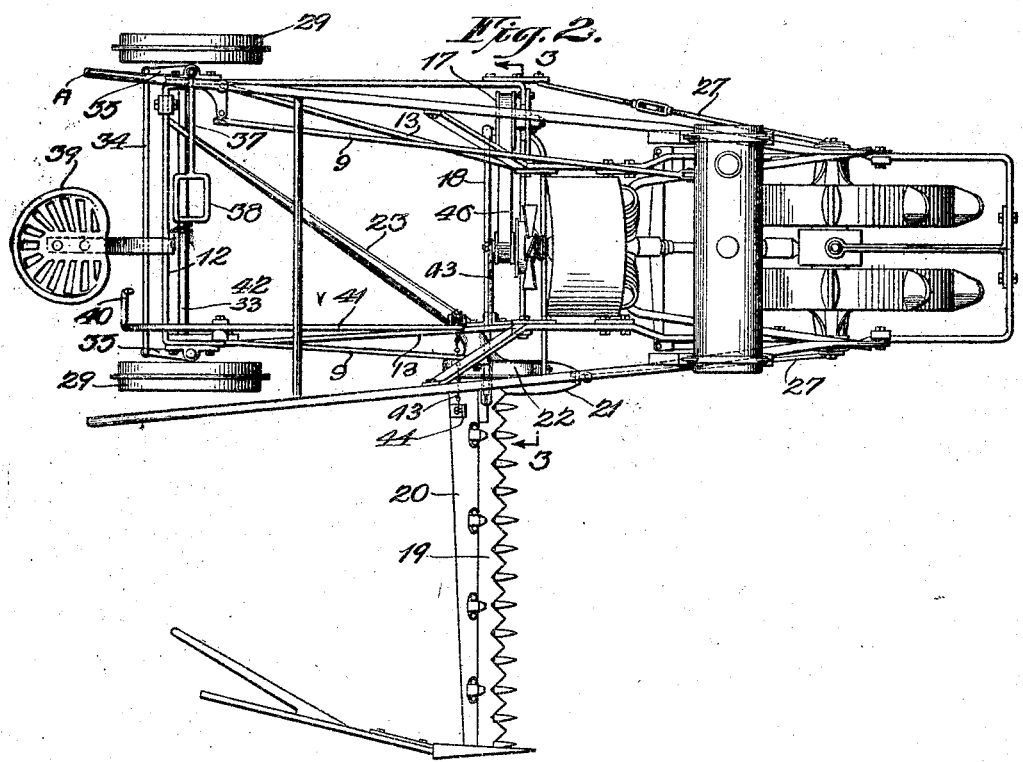
Figure 2 is a top plan view of the same.

As shown best in Figure 2, the cross bar 34 operatively unites the extension arms 35 which are rigidly mounted on the shafts 30 by the collars 36. This arrangement insures that the movement of one of the wheels 29 produces a corresponding movement in the other of the said wheels. Such movement is imparted to the wheels by means of the lever 37, at the end whereof a stirrup 38 is provided for the heel of the operator of the mower.

When the operator is disposed on the seat 39 of the implement, with his heel resting in the stirrup 38, he may, by movement of the stirrup and the lever 37, of which it is a part, swing the wheels 29 to any desired angle to the line of progression of the tractor.

The other foot of the operator rests in the loop 40 of a lifting bar 41. The lifting bar 41 has a pivot 42, and is connected with one end of the chain 43, the opposite end whereof is attached to an upright 44 rigid on the finger bar. The chain 43 is roved around a pulley 45, which is preferably mounted in the end of the reach rod 23. With this mechanism wherever the operator desires to lift the outer end of the finger bar he presses upon the loop 40 and lifts the forward end of the lifting bar 41. This draws the chain 43 inward and by means of the upright 44 the finger bar and shoe 21 will be rocked on the pivot of the shoe 21 to elevate the outer end of the finger bar.

As seen best in Figure 3 of the drawings, the crank wheel 17 is operatively connected with a pulley on the engine of the tractor by means of a belt 46.

When provided with a mower constructed and arranged in accordance with the present invention, it is obvious that the tractor and the mower may be readily and quickly united or separated by removing the bolts 11 and the turn buckle rods 27 and the belt 46. Also, when reassembling, these parts may be quickly connected in their operative relation, and the operation of the mower be resumed.

It will be understood that the structure supporting the finger bar is preferably braced as in the present instance by the rod 47.

Claim:

The combination with an automobile tractor having pivoted traction wheels and manually operated means for steering said wheels, of a trailer frame for partially supporting said tractor, said frame being removably secured to the frame of said tractor, and having at the rear thereof, carrying wheels; and means for manually operating said wheels about vertically disposed pivots for steering said frame, said means embodying pivot connections between said wheels for maintaining the same in parallel relation; and a foot operated lever connected with one of said wheels, said lever extending horizontally within the trailer frame adjacent the operating station for said tractor, said lever, having a horizontal stirrup formed at the end thereof adapted for engagement by the heel of the footwear of an operator.

JOSEPH N. PARKER.